(12) United States Patent
Muhammad

(10) Patent No.: US 9,136,889 B2
(45) Date of Patent: Sep. 15, 2015

(54) MIXER BIASING FOR INTERMODULATION DISTORTION COMPENSATION

(71) Applicant: MStar Semiconductor, Inc., Hsinchu Hsien (TW)

(72) Inventor: Khurram Muhammad, Winston-Salem, NC (US)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/021,069

(22) Filed: Sep. 9, 2013

(65) Prior Publication Data
US 2015/0071390 A1    Mar. 12, 2015

(51) Int. Cl.
*H04B 1/10* (2006.01)
*H04B 1/16* (2006.01)

(52) U.S. Cl.
CPC ... *H04B 1/10* (2013.01); *H04B 1/16* (2013.01)

(58) Field of Classification Search
CPC ..... H04L 25/06; H04L 25/061; H04L 25/062; H04L 25/063; H04L 25/064; H04L 27/2277; H04L 27/2278; H04L 27/2337; H04B 1/10; H04B 1/1027; H04B 1/12; H04B 1/123; H04B 1/16
USPC ......... 375/284, 285, 296–298, 318, 330, 331, 375/346
See application file for complete search history.

(56) References Cited

U.S. PATENT DOCUMENTS

| | | | |
|---|---|---|---|
| 2007/0291883 A1* | 12/2007 | Welz et al. | 375/350 |
| 2009/0325529 A1* | 12/2009 | Yang et al. | 455/296 |
| 2010/0091688 A1* | 4/2010 | Staszewski et al. | 370/277 |
| 2012/0077453 A1* | 3/2012 | Ahrari et al. | 455/341 |

* cited by examiner

*Primary Examiner* — Young T Tse
(74) *Attorney, Agent, or Firm* — Edell, Shapiro & Finnan, LLC

(57) ABSTRACT

To compensate for second-order intermodulation (IM2), it is determined whether a blocking signal is present at a receiver. A biasing differential is applied across downconverting mixers in the receiver that minimizes cross-correlation of quadrature signal components of a signal produced by the receiver in the presence of the blocking signal.

16 Claims, 5 Drawing Sheets

MIXER BIASING FOR INTERMODULATION DISTORTION COMPENSATION

TECHNICAL FIELD

The present disclosure relates to intermodulation distortion compensation in radio-frequency receivers.

BACKGROUND

Direct conversion receivers (DCRs) are prevalent in mobile communication systems due to their simplicity, low cost and for the reason that much of the signal processing can be achieved in the digital domain. A drawback to the elimination of an intermediate frequency stage is an increased susceptibility to second-order intermodulation effects. For example, intermodulation products generated from strong interfering signals can be downconverted to baseband with relatively weaker signals of interest, thereby desensitizing the DCR to the desired signal. Such interfering signals, referred to herein as blocking signals, are ubiquitous; they may originate from communication signals in adjacent channels and/or from transmission sources that, even when far removed in frequency from the channel of interest, transmit at a power level sufficient to cause significant interference problems in a DCR, including bit error rate (BER) and/or signal-to-noise ratio (SNR) degradation.

In view of the susceptibility to distortion by second-order effects, design specification of DCRs typically include high input-related second order intercept point (IIP2) criteria. IIP2 is the theoretical input signal level at which second-order intermodulation products are equal in power to that of a desired signal. Thus, if the IIP2 can be made higher, the power of an interfering signal must reach a correspondingly higher level to have an equivalent detrimental effect on the DCR. It is thus clearly desirable to establish IIP2 at as high a level as possible.

Second-order intermodulation distortion is an effect of non-linear behavior of components in a DCR and downconverting mixers are often mostly responsible for limits on the level to which IIP2 can be established. Compensation techniques can be applied to increase the IIP2, but changes in temperature and/or frequency can reduce the IIP2 to effectively undo applied compensation measures. Indeed, an IIP2 established at 100 dBm can be reduced to 50 dBm in response to a change in frequency or temperature.

Given the potential improvements in DCR performance that can be expected upon overcoming the foregoing limitations in the art, substantial resources are increasingly devoted toward developing interference-tolerant designs in direct conversion receivers.

SUMMARY

To compensate for second-order intermodulation (IM2), it is determined whether a blocking signal is present at a receiver. A biasing differential is applied across downconverting mixers in the receiver that minimizes cross-correlation of quadrature signal components of a signal produced by the receiver in the presence of the blocking signal.

DESCRIPTION OF EXAMPLE EMBODIMENTS

Figure 1:
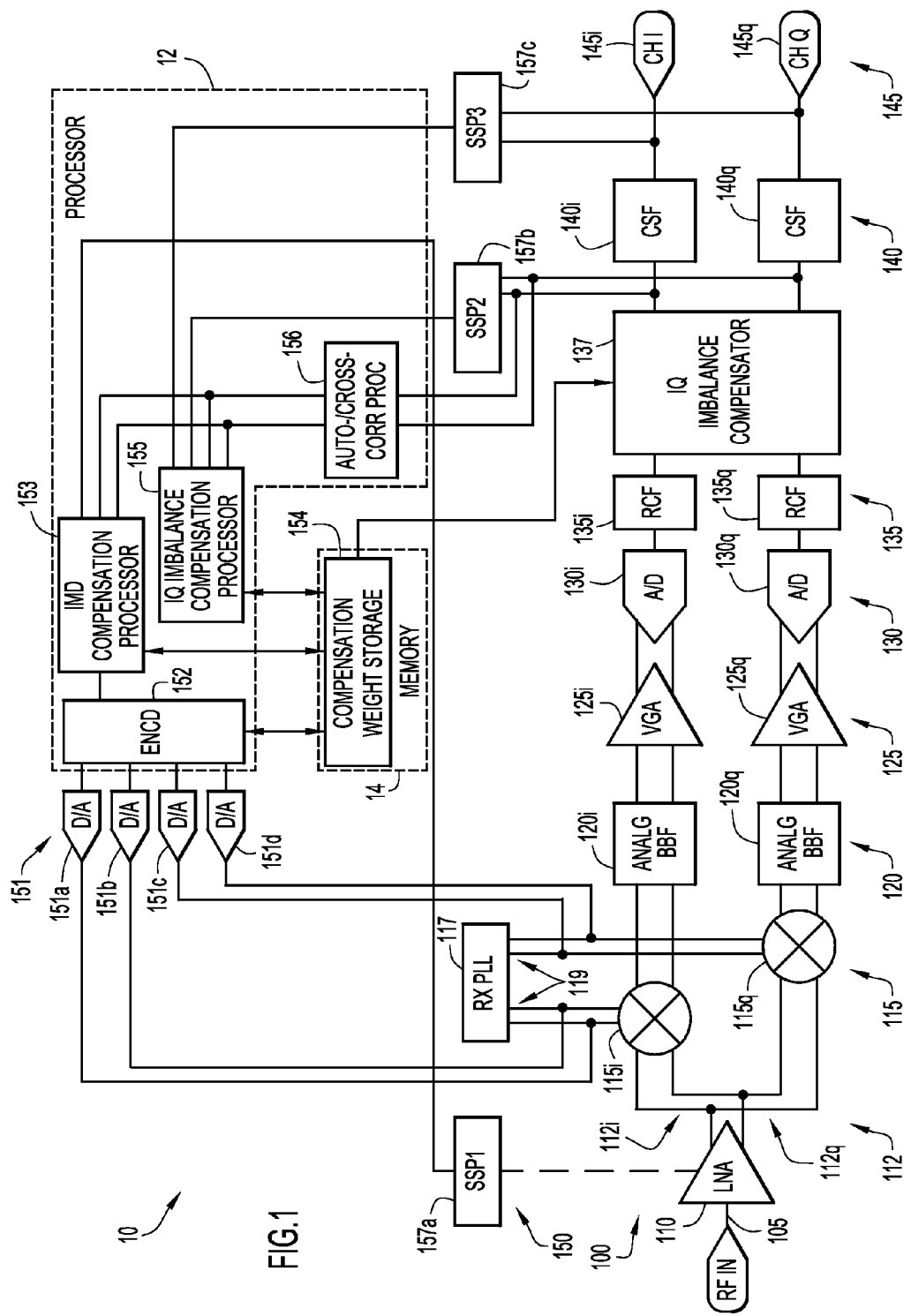
FIG. 1 is a schematic block diagram of a receiver circuit by which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

The techniques described herein are directed to compensating a receiver for intermodulation distortion in the presence of blocking signals. Upon review of this disclosure and appreciation of the concepts disclosed herein, the ordinarily skilled artisan will recognize other distortion compensation contexts in which the present inventive concept can be applied. The scope of the present invention is intended to encompass all such alternative implementations.

FIG. 1 is a schematic block diagram of an exemplary radio-frequency (RF) receiver 10 of which a receiver signal processing chain 100 and a compensation processor 150 are components. Receiver signal processing chain 100 incorporates circuitry by which an RF signal 105 is downconverted to a baseband channel signal 145 having an in-phase (I) signal component 145$i$ and a quadrature (Q) signal component 145$q$. Baseband channel signal 145 may be provided to other circuitry in receiver 10 (not illustrated) for further processing, such as baseband signal decoding.

In receiver processing chain 100, RF signal 105 is provided to a low-noise amplifier (LNA) 110 where it is amplified and provided to an I receiver channel 112$i$ and to a Q receiver channel 112$q$. The amplified RF signal is provided to mixers 115$i$ and 115$q$, representatively referred to herein as mixer(s) 115. A local oscillator (LO) signal 119 generated by receiver phase-locked loop (PLL) oscillator 117 is also provided to mixers 115, whereby the amplified RF signal is downconverted to baseband as a quadrature baseband signal having I and Q signal components respectively conveyed in I and Q receiver channels 112$i$ and 112$q$. The I and Q signal components may be provided to respective analog baseband filters 120$i$ and 120$q$, representatively referred to herein as analog filter(s) 120, whereby out-of-band spectral components are removed. The filtered baseband signal components may then be provided to respective variable gain amplifiers (VGAs) 125$i$ and 125$q$, representatively referred to herein as VGA(s) 125, prior to being converted into digital data by analog-to-digital converters (ADCs) 130$i$ and 130$q$, representatively referred to herein as ADC(s) 130. In certain embodiments, ADCs 130 operate at a higher sampling rate than subsequent processing elements in receiver 10, such as by sigma-delta modulation. When so embodied, the high sampling rate, low resolution digital data produced by ADCs 130 may be provided to corresponding rate change filters (RCFs) 135$i$ and 135$q$, representatively referred to herein as RCF(s) 135, by which relatively lower sampling rate, relatively higher resolution I and Q data words are produced. The full resolution I and Q digital data words may then be provided to an IQ imbalance compensator 137, by which data in I and Q channels 112 are compensated for differences in circuitry and concomitant processing in each channel. Such differences may be due to limitations in manufacturing that preclude fabrication of identical circuits in both channels. The compensated data may be provided to respective channel selection filters (CSFs) 140$i$ and 140$q$, representatively referred to herein as CSF(s) 140, by which signal components of all but those of a selected transmission channel are removed to produce baseband channel signal 145.

Those skilled in the radio communication arts will recognize the foregoing overview of receiver processing chain 100 as conventional and will fully understand its operation without specific implementation details thereof. Such implementation details will thus be omitted in the interest of conciseness except where such detail will enhance comprehension of the present invention. It is to be understood, however, that the present invention is not limited to specific receiver architecture or to specific components to carry out the operations of receiver signal processing chain 100. The aforementioned skilled artisans will recognize numerous receiver configurations in which the present invention can be implemented upon review of this disclosure.

Figure 2:
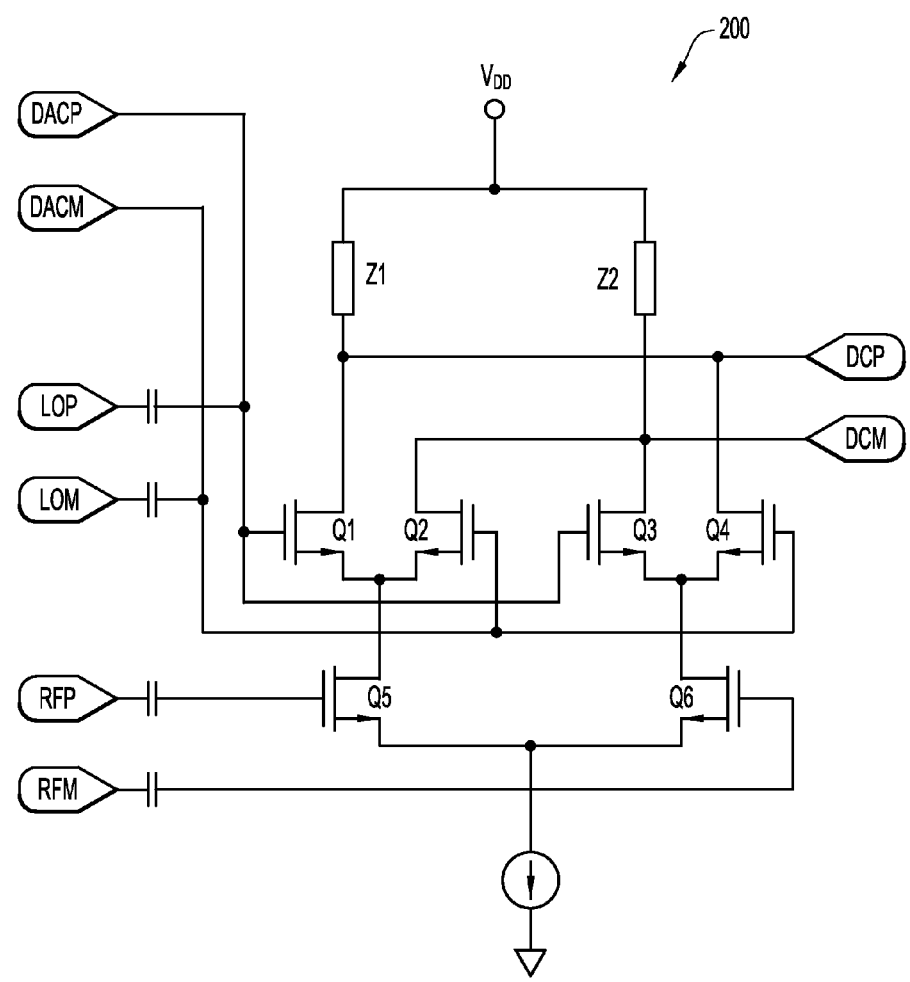
FIG. 2 is a schematic diagram of an example mixer configuration suitable for implementing embodiments of the present general inventive concept.

FIG. 2 is a schematic diagram of an exemplary mixer circuit 200 suitable for embodiments of the present invention. Such a mixer circuit may be used in receiver signal processing chain 100 to implement each of mixers 115. While mixer circuit 200 is an apt example for explaining features of the present invention, it is to be understood that the present invention is not limited to any particular mixer architecture. Those skilled in the radio arts will recognize other mixers that can be used in embodiments of the present invention without departing from the spirit and intended scope thereof.

As illustrated in FIG. 2, a differential RF signal RFP/RFM, such as from LNA 110, is applied to the differential pair of transistors Q5 and Q6. This differential pair forms a transconductance circuit by which the RF voltage is converted to an RF current. A differential LO signal LOP/LOM, such as from RX PLL 117, is applied to transistors Q1-Q4, which act as switches on the RF current produced by the Q5/Q6 differential pair. It is this switching of the RF current that effects the downconversion and the downconverted baseband signal is output as a differential signal DCP/DCM at the drains of Q1-Q4.

In certain embodiments, the LO signal 119 generated by RX PLL 117 is a set of non-overlapping square waves. For example, in certain embodiments LO signal 119 comprises a set of 25% duty cycle square waves of which only one is active at any time, such as in a sequence IP, QP, IM, QM. The IP and IM LO signals may be applied to the LOP and LOM terminals, respectively, of the I channel mixer 115$i$ and the QP and QM LO signals may be applied the LOP and LOM terminals, respectively, of Q channel mixer 115$q$. When so embodied, the following commutating sequence occurs: Q1/Q3 of mixer 115$i$ conduct, Q1/Q3 of mixer 115$q$ conduct, Q2/Q4 of mixer 115$i$ conduct and Q2/Q4 of mixer 115$q$ conduct, where those transistors Q1-Q4 in mixers 115 not specified as conducting in the foregoing sequence are non-conducting. That is, ideally, only one transistor pair Q1/Q3 or Q2/Q4 across both mixers 115 is to be in a conducting state, which would produce strictly quadrature data (separated by 90°). However, due to minute differences in the physical construction of transistors Q1-Q4, the switching times, i.e., the time at which a particular transistor Q1-Q4 is switched into conducting and non-conducting states in response to a corresponding transition in LO signal 119, are not uniformly distributed. That is, Q1-Q4 conduct when the voltage across the source/gate terminals, Vgs, is greater than the transistor's threshold voltage, Vth, which is a function of the physical construction of each transistor. Accordingly, despite the fact that the LO components do not overlap, the corresponding intervals over which the applicable transistors are in the conducting state do overlap. This timing overlap manifests itself as the presence of an I signal component in Q receiver channel 112$q$ and the presence of a Q signal component in I receiver channel 112$i$. Thus, the presence of this condition can be identified by a non-zero cross-correlation of the signals in I and Q signal channels 112.

To illustrate non-linear artifacts using a mixer such as that illustrated in FIG. 2, it is to be assumed that an RF signal 105 having the form $A_m(t)\cos(\omega_c t+\omega_m(t))$ is to be downconverted in mixers 115 using an LO signal of the form $LO=\cos(\omega_c t)-j\cdot\sin(\omega_c t)$. The RF signal and LO signal are mixed in mixers 115 and higher frequency components may be rejected or otherwise attenuated in a conventional manner, such as by lowpass filtering. The resulting receiver signal in I channel 112$i$ at the output of mixer 115$i$ may be given as, assuming ideal LO behavior, $$I = \frac{1}{2}A_m(t)\cos\omega_m(t)$$

whereas the signal at the output of mixer 115$q$ may be given as $$Q = \frac{1}{2}A_m(t)\sin\omega_m(t).$$

A second order nonlinearity in the mixing manifests itself in I and Q channels 112 as a signal component that corresponds to the square of the corresponding input signal. That is, the output of the mixer 115$i$ may be given as, $$I = \frac{1}{2}A_m(t)\cos\omega_m(t) + \beta\left\{\frac{1}{2}A_m(t)\cos\omega_m(t)\right\}^2 =$$
$$\frac{1}{2}A_m(t)\cos\omega_m(t) + \frac{1}{8}\beta A_m^2(t) + \frac{1}{8}\beta A_m^2(t)\cos 2\omega_m(t),$$

where $\beta$ is the gain of the squared term. Likewise, the output of mixer 115$q$ may be given as, $$Q = \frac{1}{2}A_m(t)\sin\omega_m(t) + \beta\left\{\frac{1}{2}A_m(t)\sin\omega_m(t)\right\}^2 =$$
$$\frac{1}{2}A_m(t)\sin\omega_m(t) + \frac{1}{8}\beta A_m^2(t) - \frac{1}{8}\beta A_m^2(t)\cos 2\omega_m(t).$$

It is to be noted that the signals in I and Q channels 112 at the output of mixers 115 have common second order terms, which can be ascertained by cross-correlation. That is, the cross-correlation computation of the terms $A_m(t)\cos\omega_m(t)$ and $A_m(t)\sin\omega_m(t)$ is very low (ideally zero) since these terms are orthogonal to each other. The remaining terms, however, which are caused by the second order nonlinearity, are not orthogonal and grow as the cross-correlation is integrated over a given integration interval (or by accumulating a given number of samples in the digital domain). Hence, integrating the cross-correlation can indicate the presence of signal artifacts that are due to the second order nonlinearity.

A non-zero cross-correlation between I and Q signal components may also exist when the LO is not ideal, e.g., when LO signal components are not orthogonal. Such a non-ideal LO signal may take the form, for example, $LO_{actual}(t) = \cos(w_c t) + j \times g \times \sin(w_c t + \theta)$, where g is the gain imbalance and $\theta$ is the phase imbalance between I and Q LO signal components. This LO signal can also be expressed as $LO_{actual}(t) = K_1 e^{j\omega_c t} + K_2 e^{-j\omega_c t}$, where $K_1$ and $K_2$ are complex factors that are functions of g and $\theta$. The presence of $K_1$ and $K_2$ causes a portion of the I signal in I channel 112$i$ to be leaked into the Q channel 112$q$, and vice versa. This mechanism can be viewed as a scaled image of the mixed signal being added to the pure IQ output. The impact of this leaked component may be characterized by the cross-correlation between I and Q signal outputs and may be subsequently removed by suitable processing, such as by IQ imbalance compensator 137. The present invention is not limited to particular techniques by which the IQ imbalance in the IQ channels outputs is eliminated and the skilled artisan will recognize numerous techniques by which this can be achieved. As one example of IQ imbalance compensation, a single tap filter in IQ imbalance compensator 137 may be used to create an image of the received signal provided at the input of IQ imbalance compensator 154. The created image may be weighted by an IQ imbalance weight obtained from compensation weight storage 154 to produce a weighted image signal that may be subtracted from the down-converted IQ signal obtained with an imperfect LO. The correct IQ imbalance weights, e.g., the coefficient of the single tap filter that forces the cross-correlation between I and Q signal components to zero in a mean square sense after the weighted image signal has been subtracted, may be determined by IQ imbalance compensation processor 155, as described further below. When the cross-correlation is zero in a mean square sense, the signals in I and Q channels 112 are orthogonal to each other and, accordingly, the image signal is eliminated. A non-zero cross-correlation between I and Q signal components may also be caused by intermodulation distortion (IMD) owing to the second order nonlinearity. IMD may be the dominant source of such cross-signal contamination in the receiver, particularly when a strong blocking signal is present at the input of LNA 110. Once the gain of LNA 110 has been applied, the blocking signal contributes significantly to the second order terms $$\frac{1}{8}\beta A_m^2(t) + \frac{1}{8}\beta A_m^2(t)\cos 2\omega_m(t)$$

and $$\frac{1}{8}\beta A_m^2(t) - \frac{1}{8}\beta A_m^2(t)\cos 2\omega_m(t)$$

in the I and Q outputs of mixers 115, where $A_m(t)$ is the magnitude and $\omega_m(t)$ is the frequency of the blocking signal. Hence, IQ imbalance calibration should be performed in the absence of a strong blocking signal, lest these second order IMD artifacts interfere. After the IQ imbalance weights have been determined and IQ imbalance compensation has been applied, an increase in the cross-correlation between I and Q signal components in the presence of a strong blocking signal can be attributed to IMD. Detection of a strong blocking signal can be performed by a peak signal detector in LNA 110 or after mixer 115. If the receiver uses a high dynamic range ADC, strong blocking signals can also be detected in the digital domain.

Non-zero cross-correlation may also be attributed to DC offsets in I and Q channels 112. Accordingly, the IQ imbalance compensation operations may be performed after removing the DC offsets. These offsets are typically static and can be characterized when strong blocking signals are not present. DC offsets also manifest in the autocorrelation of I and Q signal channels 112. All three metrics increase as DC offsets increase. When the signal power increases, all three metrics also increase together.

One technique to ameliorate IMD in the presence of strong blocking signals is to apply a DC bias to selected gates of mixers 115, such as the gate biases of switching transistors Q1-Q4 in FIG. 2, that sets the gate voltage closer to or further away from the threshold voltage Vth. This modifies the time at which these transistors turn on relative to the applied LO signal. As illustrated in FIG. 2, a bias voltage DACP may be applied to the gates of transistors Q1/Q3 and a bias voltage DACM may be applied to the gates of transistors Q2/Q4. Such biasing may be established on each of mixers 115 and the biasing voltages applied to mixer 115$i$ can be adjusted relative to the biasing voltages applied to mixer 115$q$ so as to approach the ideal commutation described above, which can be identified by zero cross-correlation of the signals in I and Q signal channels 112. Various techniques can be employed to seek a biasing differential, i.e., the difference between the biasing voltage applied to mixer 115$i$ and the biasing voltage applied to mixer 115$q$, that approaches ideal commutation, which, practically speaking, is identified by a minimum cross-correlation between the signals in I and Q signal channels 112.

Referring once again to FIG. 1, compensation processor 150 incorporates circuitry to compensate for unwanted signal processing artifacts in receiver signal processing chain 100. Compensation processor 150 may be implemented in a wide variety of analog and digital circuits, including signal converters, discrete passive and active circuit components, integrated circuits, fixed and programmable logic, essentially without limit. In certain embodiments, much of the functionality of compensation processor 150 is performed by a processor 12, which may be an application specific integrated circuit, a microcontroller, a microprocessor and combinations thereof. Processor 12 may be a programmable device that executes processing instructions stored in memory, representatively illustrated as memory 14. Upon review of this disclosure, those skilled in the signal and data processing arts will recognize numerous circuit configurations by which compensation processor 150 can be realized without departing from the spirit and intended scope of the present invention.

In certain embodiments, calibration procedures are invoked, such as by compensation processor 150, by which compensation data are generated for receiver 10. Among such compensation data are those for ameliorating the IQ imbalance described above, i.e., variability in construction across I and Q receiver channels 112. In one embodiment, as described above, IQ imbalance compensator 137 may subtract a weighted image signal from the received signal in the digital domain. The resulting difference signal may be provided to correlation processor 156 at which auto- and cross-correlations may be computed therefrom. IQ imbalance compensation processor 155 may then compute complex factors that modify the gain and phase of the image signal based on the auto- and cross-correlation data. For example, auto-correlation may be used to compare the power of the I signal component in channel 112i with the power of the Q signal component in channel 112q. This information may be used by IQ imbalance compensation processor 155 to quantify gain imbalance I and Q signal components. Once the gain imbalance is known, cross-correlation may be used to quantify the phase imbalance between I and Q signal components. Gain and phase imbalances may be formatted into, for example, the single tap filter coefficient described above, and stored as IQ imbalance weights in compensation weight storage 154. In certain embodiments, the weights are iteratively computed during the calibration phase, such as by a least mean squares algorithm, where, in each iteration, IQ imbalance compensator 137 constructs a gain- and phase-matched image signal from a currently computed IQ imbalance compensation weight and subtracts it from the received signal containing the image. IQ imbalance processor 155 may determine whether the weights are sufficient to compensate for IQ imbalance by reevaluating the auto- and cross-correlation of I and Q signal components determined by correlation processor 156. When properly calibrated, the result of subtracting the compensating image signal, i.e., that generated by IQ imbalance compensator 137 using the weights computed by IQ imbalance compensation processor 155, is an image signal residue that meets some acceptability criterion, e.g., below a predetermined signal power threshold.

Embodiments of the present invention may compensate receiver signal processing chain 100 for IMD owing to the presence of a blocking signal by tuning the gate bias of the mixer switches, as indicated above. Accordingly, compensation processor 150 may include an IMD compensation processor 153 to determine the appropriate gate voltages. In certain embodiments of the present invention, IMD compensation is achieved by applying a signal to receiver signal processing chain 100. The cross-correlation of the signal in I and Q receiver channels may be computed by, for example, correlation processor 156. In successive iterations of the IMD calibration process, one or more IMD compensation weights may be generated by IMD compensation processor 153 in accordance with a predetermined weight generation process. The generated weights may be provided to an encoder 152, which establishes a set of digital-to-analog converter (DAC) code words that when applied to DACs 151a-151d, representatively referred to herein as DAC(s) 151, generate respective voltages at the outputs of DACs 151. It is to be understood that while four (4) DACs 151 are illustrated in FIG. 1, the present invention is not so limited. The voltages are applied across mixers 115 to establish a candidate biasing differential corresponding to the compensation weights generated in each iteration. In response to the application of each candidate biasing differential, the cross-correlation of the resulting signal in I and Q channels 112 is computed by correlation processor 156. A new candidate biasing differential is generated in each iteration in accordance with the weight generation process followed by another cross-correlation computation and this process is repeated until the computed cross-correlation between I and Q channels 112 is minimized. Accordingly, the weight generation process may be realized by any number of techniques by which a minimum is sought, including steepest descent techniques, recursive least squares techniques, adaptive filter techniques, etc. The candidate biasing differential that results in the minimum cross-correlation is the biasing differential that compensates receiver processing chain 100 for blocking signal induced IMD and the compensation weights corresponding to that biasing differential may be stored in compensation weight storage 154 as IMD compensation weights. IMD compensation processor 153 may generate compensation weights that are separate and distinct from those generated by IQ imbalance compensation processor 155, and may store such distinct compensation weights in a separate segment of compensation weight storage 154.

Encoder 152 may include suitable circuitry, such as a set of latching registers (not illustrated), by which the IMD compensation weights remain in force, i.e., applied to DACs 151, until such time that it is determined that adjustments to the weights are deemed necessary or otherwise appropriate. For example, in certain embodiments, compensation processor 150 may have access to receiver temperature information and when the temperature rises to a particular level at which the IMD compensation weights are no longer accurate, the IMD compensation weights may be recomputed and applied. When the temperature reduces to previous levels, previously computed IMD compensation weights may be retrieved from compensation weight storage 154 and applied by encoder 152.

Figure 3:
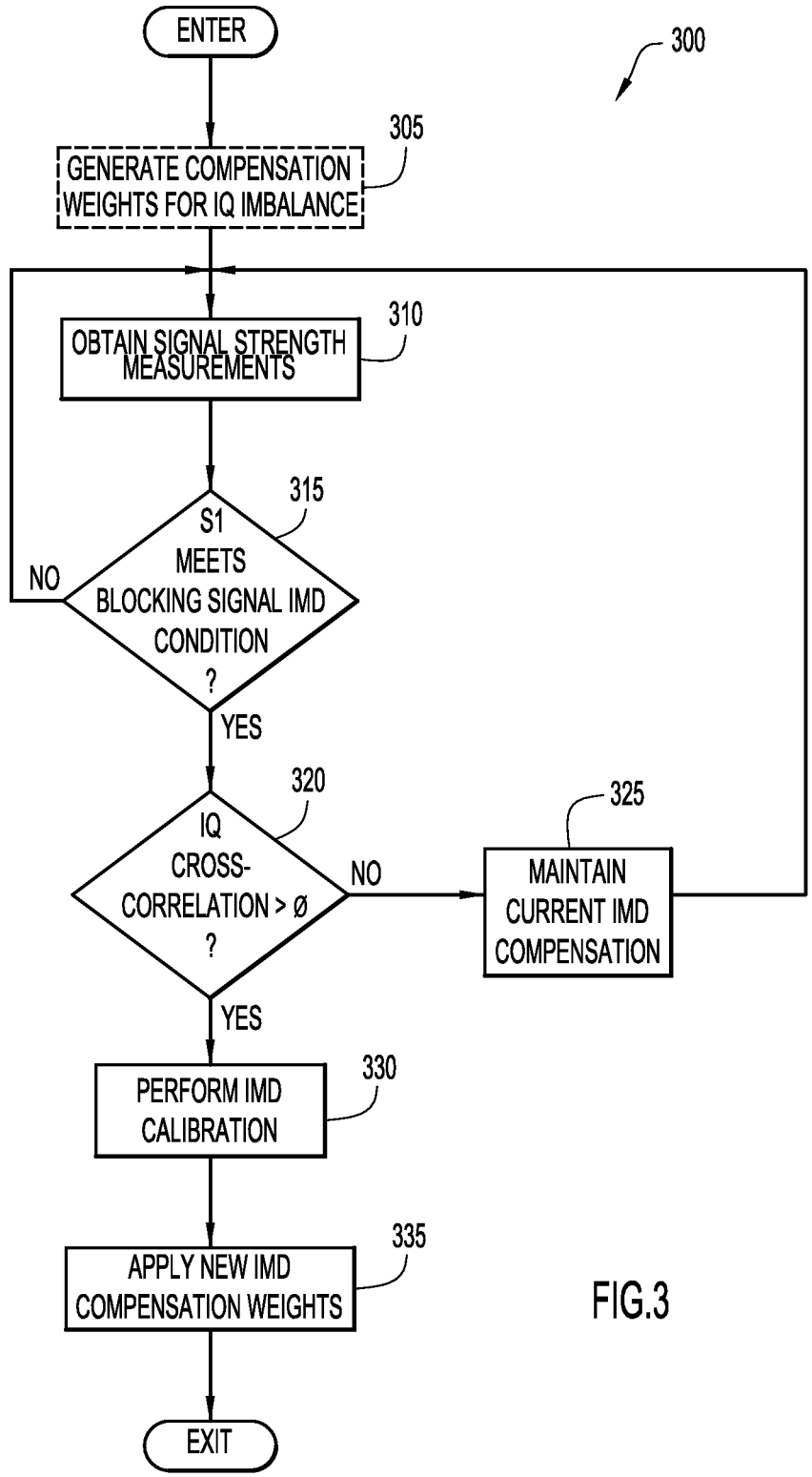
FIG. 3 is a flow diagram of an example blocking signal presence determining process in embodiments of the present general inventive concept.

FIG. 3 is a flow diagram of an exemplary blocking signal determination process 300. In certain embodiments, process 300 is performed subsequent to an IQ imbalance calibration process, as illustrated in operation 305. Accordingly, the compensation data determined for IMD is assured to be reasonably independent of IQ imbalance artifacts, i.e., circuit-related and process-related IQ imbalance is eliminated or reduced to an insignificant value by the IQ imbalance calibration. In operation 310, a signal strength measurement is obtained in a manner by which a blocking signal can be detected. Referring to FIG. 1, compensation processor 150 may include a set of signal strength processors (SSPs) 157a-157c, representatively referred to herein as SSP(s) 157 that are distributed along receiver signal processing chain 100 to obtain a signal strength measurement in progressively narrowing bands about the channel of interest. The present invention is not limited to particular mechanisms by which signal strength is assessed. Certain embodiments may use power detectors and/or received signal strength indicator (RSSI) computation units. As illustrated in FIG. 1, SSP 157a measures signal strength S1, referred to herein as signal strength S1, at the input of receiver signal processing chain 100. SSPs 157b and 157c measure signal strength in later stages of receiver signal processing chain 100 for various receiver processes, such as IQ imbalance compensation, automatic gain control, etc. Each of these SSPs 157 produces a signal that indicates the corresponding signal strength in a manner by which the signals can be suitably evaluated.

Returning to FIG. 3, a determination as to whether signal strength S1 meets a condition where blocking signal induced IMD occurs is made in operation 315. Such determination can be made on a periodic basis, such as once every five (5) seconds. In certain embodiments, operation 315 includes comparing signal strength S1 with a threshold set to a level at which second order IMD is measurable above the receiver's noise floor. If S1 does not meet the blocking signal IMD condition, process 300 returns to operation 310 to await another signal strength measurement time. If, however, a potentially second order IMD producing signal strength S1 is detected in operation 315, blocking signal determination process 300 transitions to operation 320, by which it is determined whether the cross-correlation I and Q receiver channels is zero to within some acceptability criterion. The cross-correlation may be computed by correlation processor 156, for example. If zero cross-correlation is affirmed, the IMD compensation weights currently in force are maintained in operation 325, if such have been computed, and process 300 returns to operation 310 to await another signal strength measurement S1. If, in operation 320, it is determined that the IQ cross-correlation is not zero to within the acceptability criterion, process 300 transitions to operation 330, by which an IMD compensation calibration process is conducted, such as that described with reference to FIG. 4. Process 300 then transitions to operation 335, by which the new IMD compensation weights generated by the IMD compensation calibration process performed in operation 330 are applied.

As demonstrated in FIG. 3, in certain embodiments, a particular IMD compensating biasing differential is maintained across mixers 115 until such time that it is determined that the currently in force IMD compensation weights are no longer effective. When such occurs, the cross-correlation between I and Q receiver channels will be non-zero and by monitoring the cross-correlation in the presence of blocking signals, new or updated IMD compensation weights may be obtained as needed, such as when a change in temperature or carrier frequency has occurred.

Figure 4:
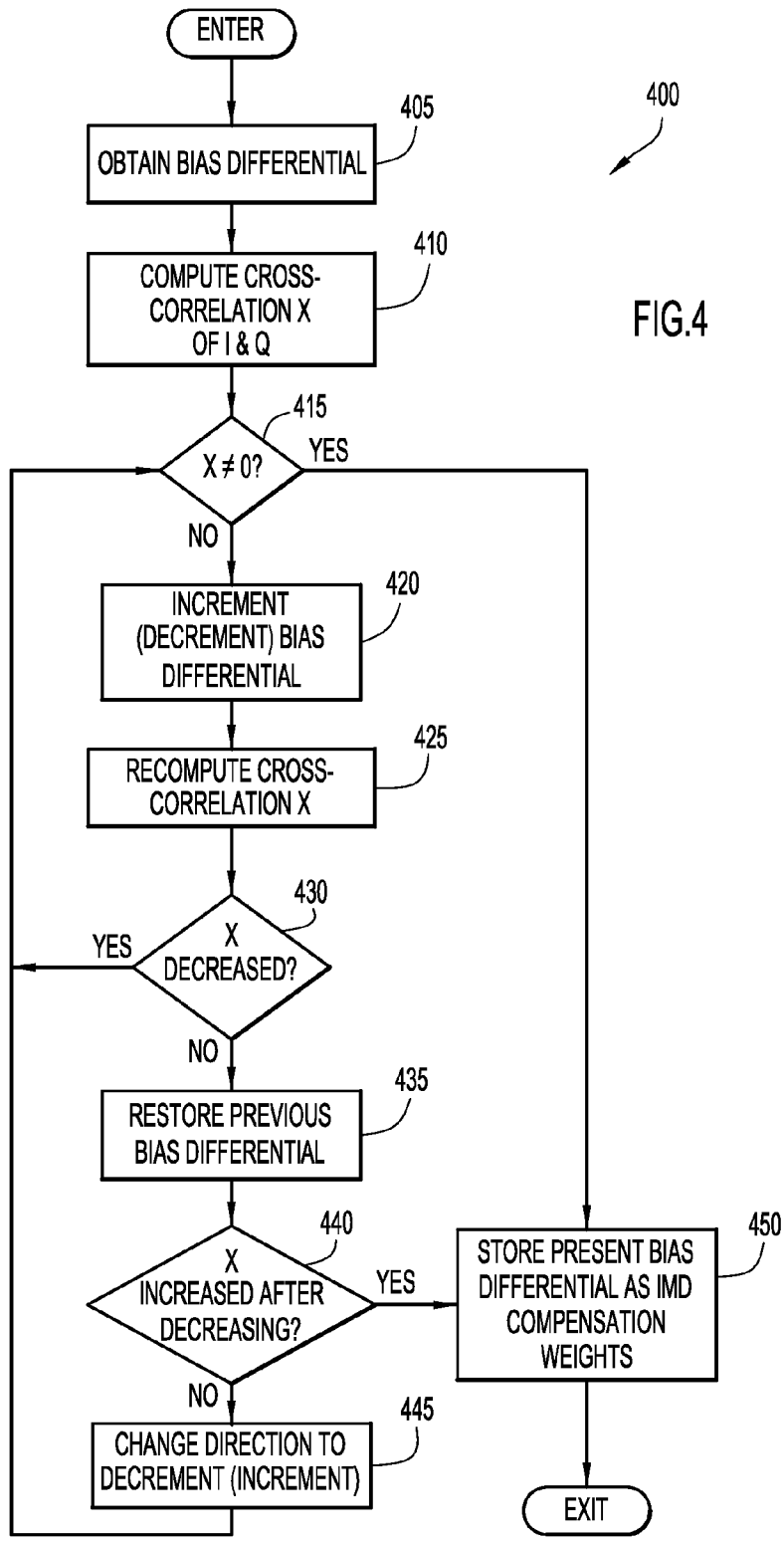
FIG. 4 is a flow diagram of an example IMD compensation weight determination process by which the present general inventive concept can be embodied.

FIG. 4 is a flow diagram of an exemplary IMD compensation weight determination process 400, which may be executed from operation 320 in FIG. 3. As such, fully-calibrated IQ imbalance compensation is in force during execution of process 400. In operation 405, an initial biasing differential is obtained. In certain scenarios, such biasing differential is that imposed by IQ imbalance compensation weights stored in compensation weight storage 154. The cross-correlation X of the signal in I and Q channels 112 is computed in operation 410 and is evaluated against zero in operation 415. If cross-correlation X is determined to be zero to within an acceptability criterion in operation 415, process 400 transitions to operation 450, where the IMD compensation weights corresponding to the biasing differential is stored in compensation weight storage 154. The stored IMD compensation weights may be the DAC code words of DACS 151 that realize the biasing differential across mixers 115. For example, the IMD compensation weights may take the form $dac_I + jdac_Q$, where $dac_I$ is the DAC code word for biasing mixer 115i and $dac_Q$ is the DAC code word for biasing mixer 115q. In certain embodiments, both $dac_I$ and $dac_Q$ represent the voltage difference in a differential mixing scheme. For example, in FIG. 2, $dac_I$ or $dac_Q$ may produce the differential biasing signal DACP-DACM. Accordingly, certain embodiments may utilize a single DAC 151 for each of I and Q channel mixers 115i and 115q, respectively, and one of biasing terminals DACP or DACM may be held at a fixed potential.

Figure 5:
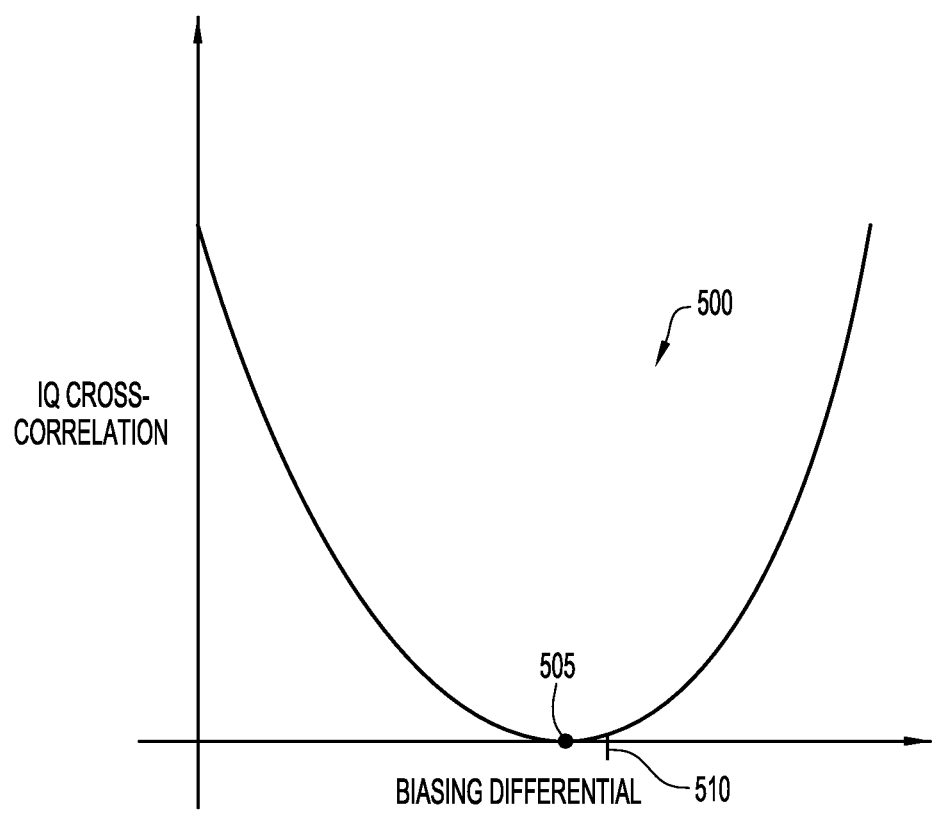
FIG. 5 is a graph of an in-phase/quadrature data cross-correlation versus mixer biasing differential curve to explain objectives of an IMD compensation weight determination process, such as that illustrated in FIG. 4.

If it is determined in operation 415 that cross-correlation X is not zero to within the acceptability criterion, the biasing differential across mixers 115 is incremented (or decremented) by a predetermined incremental value in accordance with a weight generation process, such as realized by steepest descent techniques, recursive least squares techniques, adaptive filter techniques, etc. In certain embodiments, the biasing differential is changed by a value corresponding to one bit addition to (or subtraction from) the code words of one of DACs 115. Cross-correlation X is recomputed in operation 425 and, in operation 430, it is determined whether the increment in the biasing differential resulted in a decrease in the cross-correlation. If so, process 400 transitions back to operation 415 and operations 420 and 425 are repeated as required to minimize the cross-correlation between I and Q signal components. If, on the other hand, the change in biasing differential did not result in a decrease in cross-correlation X, the biasing differential before the change is restored in operation 435. In operation 440, it is determined whether the change in the biasing differential that resulted in an increase in cross-correlation X follows a change in the biasing differential that resulted in a decrease in cross-correlation X. If such is not the case, i.e., that changing the biasing differential has yet to result in a decrease in cross-correlation X, process 400 transitions to operation 445, by which the increment to the biasing differential changes direction, e.g., from incrementing to decrementing, or vice-versa. IMD compensation weight determination process 400 then transitions back to operation 415 and repeats from that point. Turning momentarily to FIG. 5, there is illustrated a cross-correlation versus biasing differential curve 500. As is illustrated in the figure, curve 500 is convex to have a minimum value 505, where the IQ cross-correlation is zero. An incremental increase in a biasing differential value applied to a candidate biasing differential value that lies to the left of minimum point 505 results in a decrease in the cross-correlation between the signal in I and Q channels 112, while the same increase to a candidate biasing differential value that lies to the right of minimum point 505 results in an increase in the cross-correlation. The objective of IMD compensation weight determination process 400 is to find a biasing differential, representatively illustrated at biasing differential value 510, that is as close to minimum point 505 as possible, subject to the constraints imposed by the discrete increment size of DACs 151. As described above, in operation 440 of process 400, it is determined whether the latest increment resulted in minimum point 500 being passed through (corresponding to the "Yes" path) or whether the increment was in the wrong direction with respect to minimum point 505 (corresponding to the "No" path). If it is determined that the latest increment resulted in minimum point 500 being passed through, then, returning once again to FIG. 4, process 400 transitions to operation 450 where the presently applied biasing differential, or the IMD compensation weights corresponding thereto is stored in compensation weight storage 154. In certain embodiments, when minimum point 500 is passed through by successive iterations, the cross-correlation corresponding to the present biasing differential and the cross-correlation corresponding to the biasing differential before the most recent increment, i.e., that corresponding to the opposing side of minimum point 505 on curve 500, are compared and the biasing differential corresponding to the cross-correlation that is closest to zero is that which is stored in operation 450.

In certain embodiments, the selection of the candidate biasing differential in each iteration is achieved by a steepest descent algorithm in which the quantity being sought, i.e., the weight, is defined as the DAC code that produces the correct biasing differential and the error is defined as the cross-correlation between I and Q signal components. The update is constrained by the algorithm towards the direction of steepest descent, (for example, the direction indicated by the sign of the weight update term in a sign-sign least mean squares (LMS) algorithm) and, over a number of iterations, usually fewer in number than the simple search strategy portrayed in FIG. 4, the mixer gate biasing differential is tuned towards zero cross-correlation. In one embodiment, the IMD imbalance compensation processor 155 implements an LMS process that computes the next weight in accordance with the differential rate of change of the error (e.g., the cross-correlation) per change in IMD compensation weight (DAC codes, $dac_I + j\, dac_Q$).

In certain cases, the IMD compensation calibration process may take longer than the time over which the blocking can be assumed to be present at the antenna. If such is determined to be the case, an artificial blocking signal can be injected for purposes of calibration. For example, the transmitter (not illustrated) operating in the same unit as receiver 10 may be operated to generate a signal at maximum power. The resulting high power signal may be parasitically coupled into LNA 105, such as through a transmit/receive switch (not illustrated) of finite isolation, and used as a blocking signal. Alternatively, an auxiliary transmitter can be added into the same device on which receiver 10 is installed whose purpose is to inject signals into LNA 110 by way of auxiliary paths for the sole purpose of providing training signals of sufficient amplitude to induce IMD. When so embodied, the training signal may be injected for as long as is necessary for the IMD compensation weight estimates to converge to final values. In yet another alternative, the steepest descent algorithm can be executed whenever a strong blocking signal is detected at the input of receiver 10 and suspended when the blocking signal is no longer present. The suspended process can be restarted from the point of suspension upon detection of another strong blocking signal at the input of LNA 110.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method of compensating a receiver for intermodulation distortion, the method comprising:
    mixing, by downconverting mixers, an RF signal with a biasing differential to generate a baseband signal;
    determining intermodulation distortion compensation weights based on the baseband signal; and
    generating a voltage to apply as the biasing differential based on the determined intermodulation distortion compensation weights wherein the biasing differential is applied across the downconverting mixers in the receiver to minimize cross-correlation of quadrature signal components of the RF signal produced by the receiver in the presence of a blocking signal.

2. The method of claim 1, further comprising:
    determining whether the blocking signal is present at the receiver;
    computing the cross-correlation of the quadrature signal components concurrently with the biasing differential applied across the downconverting mixers responsive to determining that the blocking signal is present at the receiver;
    determining another biasing differential that minimizes the cross-correlation of the quadrature signal components responsive to determining that the computed cross-correlation is not minimized; and
    applying the another biasing differential across the downconverting mixers.

3. The method of claim 2, wherein determining whether the blocking signal is present comprises:
    measuring signal strength of a signal present at the receiver; and
    affirming the presence of the blocking signal when the measured signal strength meets a blocking signal induced intermodulation distortion condition.

4. The method of claim 3, wherein affirming the presence of the blocking signal comprises:
    affirming the presence of the blocking signal when the measured signal strength exceeds a signal strength threshold above which the blocking signal induced intermodulation distortion condition is measurable above a noise floor of the receiver.

5. The method of claim 1, wherein applying the biasing differential comprises:
    incrementing, in successive iterations, a candidate biasing differential;
    applying, in respective iterations, the candidate biasing differential across the mixers;
    computing, in the respective iterations, the cross-correlation of the quadrature signal components in response to the applied candidate biasing differential;

terminating the incrementing of the candidate biasing differential in response to a determination that the computed cross-correlation is minimized; and applying the candidate biasing differential corresponding to the minimized computed cross-correlation as the biasing differential.

6. The method of claim 5, wherein incrementing the candidate biasing differential comprises:

incrementing, in the respective iterations, the candidate biasing differential in a steepest descent sense towards the biasing differential.

7. The method of claim 5, further comprising:

applying, as a first candidate biasing differential, the biasing differential that minimizes the cross-correlation of the quadrature signal components of another signal produced by the receiver in the absence of the blocking signal.

8. The method of claim 7, wherein applying the first candidate biasing differential comprises:

retrieving from a memory in-phase and quadrature phase imbalance calibration weights; and determining the first candidate biasing differential from the retrieved in-phase and quadrature phase imbalance calibration weights.

9. A receiver having downconverting mixers in a receiver signal processing chain, the receiver comprising:

the downconverting mixers configured to mix an RF signal with a biasing differential to generate a baseband signal;

a processor configured to determine intermodulation distortion compensation weights to minimize cross-correlation of quadrature signal components of the RF signal produced by the receiver in the presence of a blocking signal; and a circuit configured to generate a voltage to apply as the biasing differential across the downconverting mixers based on the determined intermodulation distortion compensation weights.

10. The receiver of claim 9, wherein the processor is further configured to:

determine whether the blocking signal is present at the receiver;

compute the cross-correlation of the quadrature signal components in response to the determination that the blocking signal is present concurrently with the biasing differential applied across the downconverting mixers;

determine other intermodulation distortion compensation weights, in response to a determination that the computed cross-correlation is not minimized, that, when provided to the circuit that generates the voltage, produces the biasing differential that minimizes the cross-correlation of the quadrature signal components; and provide the other intermodulation distortion compensation weights to the circuit that generates the voltage.

11. The receiver of claim 10, further comprising:

a signal strength measuring device configured to measure signal strength of a signal present at the receiver; and wherein the processor is further configured to affirm the presence of the blocking signal when the measured signal strength meets a blocking signal induced intermodulation distortion condition.

12. The receiver of claim 11, wherein the blocking signal induced intermodulation distortion condition is met when the measured signal strength exceeds a signal strength threshold above which the blocking signal induced intermodulation distortion condition is measurable above a noise floor of the receiver.

13. The receiver of claim 9, wherein the processor determines the intermodulation distortion compensation weights by:

incrementing, in successive iterations, candidate intermodulation distortion compensation weights that, when provided to the circuit that generates the voltage, a candidate biasing differential is applied across the mixers;

providing, in respective iterations, the candidate intermodulation distortion compensation weights to the circuit that generates the voltage;

computing, in the respective iterations, the cross-correlation of the quadrature signal components in response to the applied candidate biasing differential;

terminating the incrementing of the candidate intermodulation distortion compensation weights in response to a determination that the computed cross-correlation is minimized; and storing the candidate intermodulation distortion compensation weights corresponding to the biasing differential for which the computed cross-correlation is minimized as the intermodulation distortion compensation weights.

14. The receiver of claim 13, wherein the processor increments the candidate intermodulation distortion compensation weights in a steepest descent sense towards the biasing differential.

15. The receiver of claim 13, wherein the processor applies, as first candidate intermodulation distortion compensation weights, the intermodulation distortion compensation weights that minimize the cross-correlation of the quadrature signal components of another signal produced by the receiver in the absence of the blocking signal.

16. The receiver of claim 15, wherein the processor is further configured to:

retrieve from a memory in-phase and quadrature phase imbalance calibration weights; and determine the first candidate intermodulation distortion compensation weights from the retrieved in-phase and quadrature phase imbalance calibration weights.

* * * * *